US009791137B2

(12) United States Patent
Li et al.

(10) Patent No.: US 9,791,137 B2
(45) Date of Patent: Oct. 17, 2017

(54) LAMP WITH ASSEMBLING AND DISASSEMBLING FUNCTION

(71) Applicants: Guoying Li, Guangdong (CN); Guangming Wu, Guangdong (CN); Zhibin Feng, Guangdong (CN); Bing Liang, Guangdong (CN); Guoxin Yu, Guangdong (CN)

(72) Inventors: Guoying Li, Yangjiang (CN); Guangming Wu, Yangjiang (CN); Zhibin Feng, Yangjiang (CN); Bing Liang, Yangjiang (CN); Guoxin Yu, Yangjiang (CN)

(73) Assignees: NEXTORCH INDUSTRIES CO., LTD., Yangjiang (CN); POWER SOURCE INDUSTRIES CO., LTD., Yangjiang (CN); WAVE POWER SOURCE POLICE EQUIPMENTS CO., LTD., Yangjiang (CN)

( * ) Notice: Subject to any disclaimer, the term of this patent is extended or adjusted under 35 U.S.C. 154(b) by 47 days.

(21) Appl. No.: 14/768,790

(22) PCT Filed: Feb. 19, 2013

(86) PCT No.: PCT/CN2013/071672

§ 371 (c)(1),
(2) Date: Aug. 19, 2015

(87) PCT Pub. No.: WO2014/127505

PCT Pub. Date: Aug. 28, 2014

(65) Prior Publication Data

US 2016/0003460 A1 Jan. 7, 2016

(51) Int. Cl.

*F21L 4/00* (2006.01)
*H04M 1/22* (2006.01)

(Continued)

(52) U.S. Cl.

CPC .............. *F21V 21/34* (2013.01); *F21V 21/08* (2013.01); *F41G 1/35* (2013.01); *F41G 11/003* (2013.01); *F21V 23/0421* (2013.01)

(58) Field of Classification Search

CPC .. F21V 21/08; F21V 21/0885; F21V 21/0965; F21V 21/34; F21V 23/0421;

(Continued)

(56) References Cited

U.S. PATENT DOCUMENTS 3,877,166 A 4/1975 Ward
3,986,285 A 10/1976 Krisay (Continued)

FOREIGN PATENT DOCUMENTS

| | | | |
|---|---|---|---|
| CN | 2874402 | Y | 2/2007 |
| CN | 101140150 | A | 3/2008 |
| CN | 101813240 | A | 8/2010 |
| CN | 201724606 | U | 1/2011 |
| CN | 202083283 | U | 12/2011 |

OTHER PUBLICATIONS

International Search Report for corresponding application PCT/CN2013/071672 filed Feb. 19, 2013; dated Oct. 31, 2013.

*Primary Examiner* — Alexander Garlen
(74) *Attorney, Agent, or Firm* — Cantor Colburn LLP

(57) ABSTRACT

The invention discloses a lamp with an assembling and disassembling function, which includes a lamp tube, wherein a fixing element for mounting with an equipment guide rail is arranged on the lamp tube, and the fixing element includes a mounting sliding chute, which is adapted to the equipment guide rail, so that the mounting sliding chute can slide into the equipment guide rail; a locking element, which is arranged in the mounting sliding chute and is pressed against and matched with a groove of the equipment guide rail to fix the lamp tube on the equipment guide rail; and an operating element, an outer contour of the operating element being exposed from an outer contour of (Continued)

the lamp tube, an interior of the operating element being connected with the locking element, the rotating element being rotated to drive the locking element to lock and unlock equipment.

6 Claims, 3 Drawing Sheets

(51) Int. Cl.

| | |
|---|---|
| ***F21V 21/34*** | (2006.01) |
| ***F21V 21/08*** | (2006.01) |
| ***F41G 11/00*** | (2006.01) |
| ***F41G 1/35*** | (2006.01) |
| *F21V 23/04* | (2006.01) |

(58) Field of Classification Search
CPC .......... F41G 1/35; F41G 11/003; F21L 4/005; F21L 15/08; F21L 15/10; F21L 15/14
See application file for complete search history.

(56) References Cited

U.S. PATENT DOCUMENTS

| | | | | | |
|---|---|---|---|---|---|
| 5,628,555 | A * | 5/1997 | Sharrah | F41G 1/34 | 362/114 |
| 5,816,683 | A * | 10/1998 | Christiansen | F41C 27/00 | 362/110 |
| 6,276,088 | B1 * | 8/2001 | Matthews | F21L 4/005 | 362/110 |
| 7,225,577 | B1 * | 6/2007 | Wang | F41G 11/003 | 42/124 |
| 2005/0257415 | A1 * | 11/2005 | Solinsky | F41G 11/003 | 42/146 |
| 2009/0140015 | A1 * | 6/2009 | Faifer | F41C 23/16 | 224/191 |
| 2010/0097789 | A1 | 4/2010 | Sharrah | | |
| 2012/0014105 | A1 * | 1/2012 | Jigamian | F21V 15/04 | 362/267 |

* cited by examiner

LAMP WITH ASSEMBLING AND DISASSEMBLING FUNCTION

TECHNICAL FIELD OF THE INVENTION

The invention relates to the technical field of illumination equipment, and in particular to a lamp with an assembling and disassembling function.

BACKGROUND OF THE INVENTION

All lamps with an assembling and disassembling function in prior art are arranged on equipment with a mobile illumination requirement, for example, a gun lamp is mounted on a gun or an illumination lamp is mounted on a safety helmet. However, the lamps mounted on the equipment in prior art are easily loosened to cause the problems of instability and inconvenience in operation over the lamps in a using process.

SUMMARY OF THE INVENTION

The invention is intended to provide a lamp with an assembling and disassembling function, so as to solve the problem that a lamp mounted on equipment in prior art is easily loosened to cause instability and inconvenience in operation over the lamp in a using process.

In order to achieve the purpose, the invention provides a lamp with an assembling and disassembling function, which comprises a lamp tube, wherein a fixing element for mounting with an equipment guide rail is arranged on the lamp tube, and the fixing element comprises a mounting sliding chute, which is adapted to the equipment guide rail, so that the mounting sliding chute can slide into the equipment guide rail; a locking element, which is arranged in the mounting sliding chute and pressed against and matched with a groove of the equipment guide rail to fix the lamp tube on the equipment guide rail; and an operating element, an outer contour of the operating element being exposed from an outer contour of the lamp tube, an interior of the operating element being connected with the locking element, and the operating element being rotated to drive the locking element to lock and unlock equipment.

Furthermore, the locking element comprises a first pressing part, and the first pressing part is arranged movably towards the equipment; a first end of the first pressing part is pressed against the groove of the equipment guide rail, and a second end of the first pressing part is provided with a threaded section; and the operating element includes a first operating part, and the first operating part is in drivable connection with the first pressing part.

Furthermore, the second end of the first pressing part is provided with the threaded section; the first operating part is a roller with a threaded hole matched with the threaded section; and an outer contour of the roller is exposed from the outer contour of the lamp tube.

Furthermore, the locking element includes a second pressing part, which is arranged movably towards the equipment, a first end of the second pressing part being pressed against the groove of the equipment guide rail; an elastic part, which is connected between the lamp tube and the second pressing part and applies elastic force of moving towards the equipment to the second pressing part; a returning part, which is pivotally connected to the lamp tube, a free end of the returning part being connected with the second pressing part and applying force of moving far away from the equipment to the second pressing part; and moreover, the operating element includes a second operating part, and the second operating part is in drivable connection with the returning part, and drives the returning part to pivot.

Furthermore, a pushbutton switch is arranged in the lamp tube; the lamp with the assembling and disassembling function further comprises a handle portion; and a first end of the handle portion is in drivable connection with the pushbutton switch, and a second end of the handle portion is positioned on the outer side of the lamp tube.

Furthermore, the lamp with the assembling and disassembling function further includes a lamp base connected with the lamp tube; a battery is arranged in the lamp tube; and a non-electric connected elastic element is arranged between one electrode of the battery and an electrode connecting part in the lamp tube.

Furthermore, the lamp further comprises a handle lock operating part and a handle lock; the handle lock operating part is connected together with the handle lock; moreover, both the handle lock operating part and the handle lock are arranged between the lamp tube and the handle portion; the handle lock operating part can be pushed to drive the handle lock to move; and the handle lock have a first state in which the handle portion is pressed so as not to be moved and a second state in which the handle portion can freely move.

Furthermore, a sighting device and a circuit board are further arranged on the lamp tube; both the sighting device and the lamp base are electrically connected with the circuit board; the circuit board is mounted in the lamp tube; and the sighting device is mounted on a housing of the lamp tube.

Furthermore, electric connection between each of the sighting device and the lamp base and the circuit board adopts elastic conductor connection.

According to the technical solution of the invention, the lamp with the assembling and disassembling function comprises the lamp tube, wherein the fixing element for mounting with the equipment guide rail is arranged on the lamp tube, and the fixing element comprises the mounting sliding chute, which is adapted to the equipment guide rail, so that the mounting sliding chute can slide into the equipment guide rail; the locking element, which is arranged in the mounting sliding chute and pressed against and matched with the groove of the equipment guide rail to fix the lamp tube on the equipment guide rail; and the operating element, the outer contour of the operating element being exposed from the outer contour of the lamp tube, the interior of the operating element being connected with the locking element, the operating element being rotated to drive the locking element to lock and unlock the equipment. The portable lamp is fixed on the equipment at first through the mounting sliding chute, and then is locked and fixed through the locking element to be stably mounted on the equipment without loosening, so that the conditions of falling of the portable lamp and the like in a movement process of the equipment are avoided, and moreover, the lamp with the assembling and disassembling function can be rapidly and reliably assembled and disassembled, and is very convenient to operate.

BRIEF DESCRIPTION OF THE DRAWINGS

The drawings forming a part of the invention are adopted to provide further understanding of the invention, and schematic embodiments of the invention and description thereof are adopted to explain the invention and not intended to form proper limits to the invention. In the drawings.

The drawings include drawing references as follows:

10: lamp tube; 20: mounting sliding chute; 30: locking element; 40: handle portion; 50: lamp base; 11: switch; 12: battery; 13: elastic element; 60: operating element; 31*a*: first pressing part; 32*a*: first operating part; 31*b*: second pressing part; 32*b*: second operating part; 33: elastic part; 34: returning part; 41*b*: handle lock operating part; 42*b*: handle lock; 70: sighting device; 80: screw; and 90: circuit board.

DETAILED DESCRIPTION OF THE EMBODIMENTS

It is important to note that the embodiments in the invention and characteristics in the embodiments can be combined under the condition of no conflicts. The invention is described below with reference to the drawings and the embodiments in detail.

Figure 1:
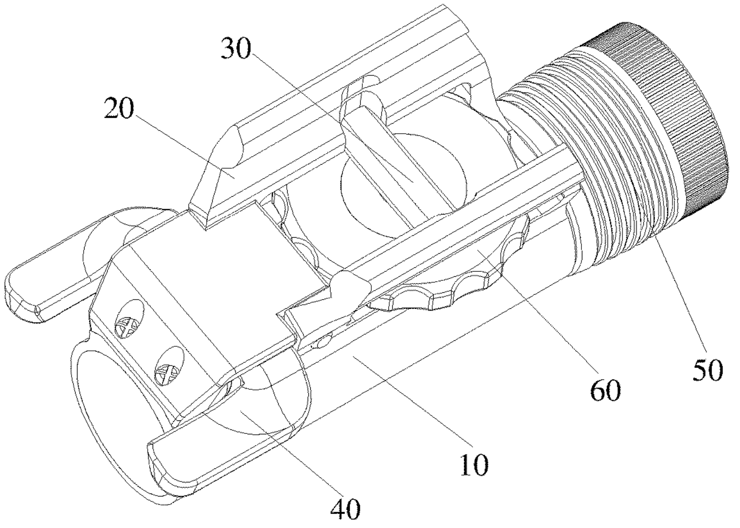
FIG. 1 is a three-dimensional structure diagram of a first embodiment of a lamp with an assembling and disassembling function according to the invention.

The invention provides a first embodiment of a lamp with an assembling and disassembling function. The lamp with the assembling and disassembling function in the embodiment is described by taking a gun lamp as an example, but the lamp with the assembling and disassembling function in the invention is not limited to the gun lamp, and may be lamps with the assembling and disassembling function in the other fields. The structure of the embodiment is specifically shown in FIG. 1 and FIG. 2. The lamp with the assembling and disassembling function comprises a lamp tube 10, wherein a fixing element for mounting the lamp on a gun guide rail is arranged on the lamp tube 10, and the fixing element comprises a mounting sliding chute 20 and a locking element 30; the mounting sliding chute 20 is adapted to the gun guide rail, so that the mounting sliding chute 20 can slide into the gun guide rail; the locking element 30 is arranged in the mounting sliding chute 20, and is pressed against and matched with the groove of the gun guide rail to fix the lamp tube 10 on the gun guide rail; an outer contour of an operating element 60 is exposed from an outer contour of the lamp tube 10; an interior of the operating element 60 is connected with the locking element 30; and the operating element 60 can be rotated to drive the locking element 30 to perform locking and unlocking operation on equipment. Sliding rails are arranged on sidewalls of the mounting sliding chute 20, and the gun guide rail can be guided to slide into the mounting sliding chute; and a force application direction of the locking element 30 faces the gun guide rail, and the gun guide rail is closely attached to the mounting sliding chute to finish a locking process.

The gun guide rail can slide into the mounting sliding chute, and then the gun guide rail is locked by the locking element to realize the close fit of the lamp on the gun guide rail, so that the lamp can be prevented from being loosened in a using process, and the problem of instability caused by a high loosening rate of the lamp mounted on a gun in the using process is solved. In addition, in a disassembling process, a locked state of the gun guide rail is released at first through the locking element, and then the lamp is disassembled. When the lamp with the assembling and disassembling function in the embodiment is used for other equipment, the lamp with the assembling and disassembling function is fixed on the equipment at first through the mounting sliding chute, and then is locked and fixed through the locking element, so that the lamp with the assembling and disassembling function can be stably mounted on the equipment without loosening, and the conditions of falling of the lamp and the like in a movement process of the equipment are avoided.

Figure 2:
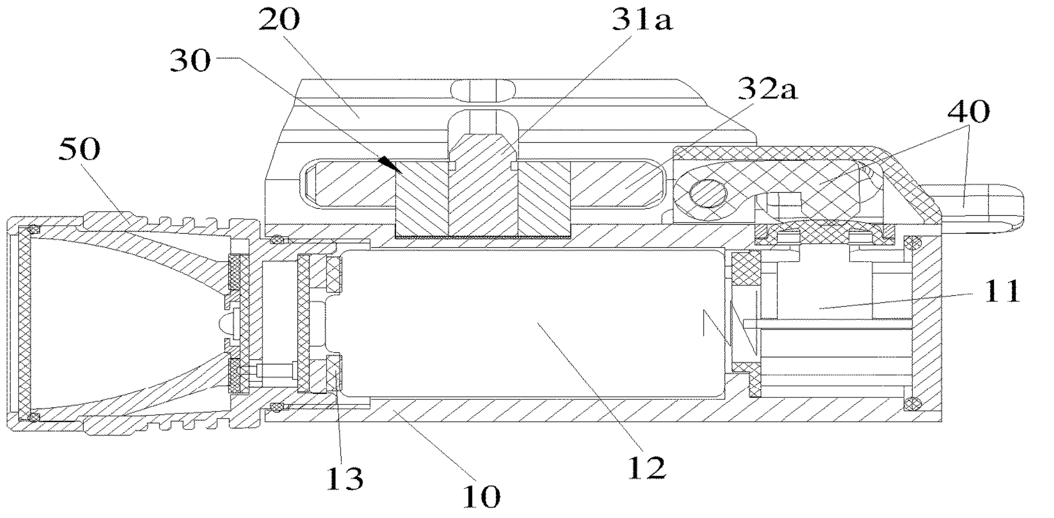
FIG. 2 is an internal structure diagram of the lamp with the assembling and disassembling function in FIG. 1.

Preferably, according to the embodiment, as shown in FIG. 2, the locking element 30 further comprises a first pressing part 31*a*, wherein the first pressing part 31*a* is arranged movably towards the equipment; a first end of the first pressing part 31*a* is pressed against the groove of the equipment guide rail, and a second end of the first pressing part 31*a* is provided with a threaded section; and the operating element 60 comprises a first operating part 32*a*, and the first operating part 32*a* is in drivable connection with the first pressing part 31*a*. The first pressing part 31*a* can be driven by the first operating part 32*a* to move to lock the equipment through the first pressing part 31*a*, and when locking is required, the first operating part 32*a* is controlled to drive the first pressing part 31*a* to move towards the groove of the gun guide rail, and the lamp and the gun guide rail are pressed into a closely attached state through the first pressing part.

The second end of the first pressing part 31*a* is provided with the threaded section, the first operating part 32*a* is a roller with a threaded hole matched with the threaded section, an outer contour of the roller is protruded from the outer contour of the lamp tube 10, and the outer contour of the roller is exposed from the outer contour of the lamp tube 10. The first operating part 32*a* in the embodiment is a roller, and the outer contour of the roller is protruded from the lamp tube, so that the roller can be conveniently and rapidly operated; and when the roller is rotated, the threaded hole of the roller is matched with the threaded section of the first pressing part 31*a*, so that the first pressing part 31*a* moves towards the groove of the gun guide rail or far away from the groove of the gun guide rail, and the roller can be operated to drive the first pressing part 31*a* to lock the gun lamp onto the gun guide rail.

A switch 11 is arranged in the lamp tube 10. The gun lamp further comprises a handle portion 40, wherein a first end of the handle portion 40 is in drivable connection with the pushbutton switch 11, and a second end of the handle portion 40 is positioned on the outer side of the lamp tube 10. The gun lamp further comprises a lamp base 50 connected with the lamp tube 10, wherein a battery 12 is arranged in the lamp tube 10, and a non-electric connected elastic element 13 is arranged between one electrode of the battery 12 and an electrode connecting part in the lamp tube. No matter whether the elastic element 13 of the embodiment adopts an elastic rubber pad or spring, a corresponding technical effect can be achieved. The non-electric connected elastic element is arranged between the battery and the lamp base in the gun lamp, and the lamp base can be unscrewed to disconnect the battery and a head circuit of the lamp base to realize a safe locking function to keep the lamp in an off state; and the lamp base is screwed to release the locking of the off state. The handle portion 40 of the embodiment is arranged at the tail of the gun lamp, and handle-shaped parts of the handle portion 40 are positioned on the two sides of the gun lamp, the handle portion is operated to control and switch on and off modes of the lamp on the premise of releasing the locking of the off state, and moreover, the handle portion can be lightly touched to turn on the lamp in the state that the locking of the off state of the lamp is released, so that the gun lamp is endowed with a spot lighting function, and the lamp with the assembling and disassembling function in the embodiment is easy and convenient to operate and practical.

Figure 3:
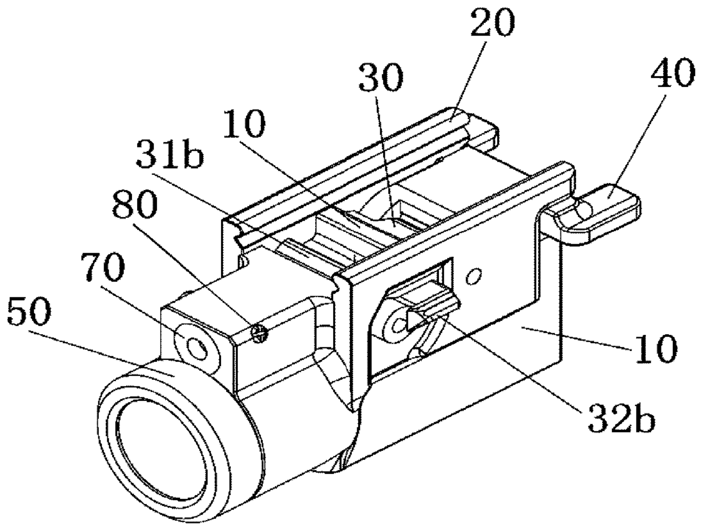
FIG. 3 is a three-dimensional structure diagram of a second embodiment of a lamp with an assembling and disassembling function according to the invention.
Figure 4:
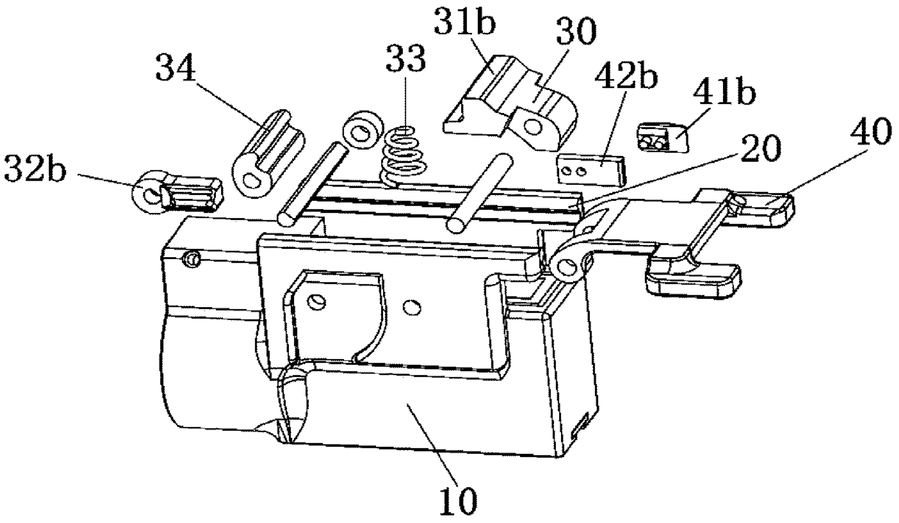
FIG. 4 is a breakdown structure diagram of the lamp with the assembling and disassembling function in FIG. 3.
Figure 5:
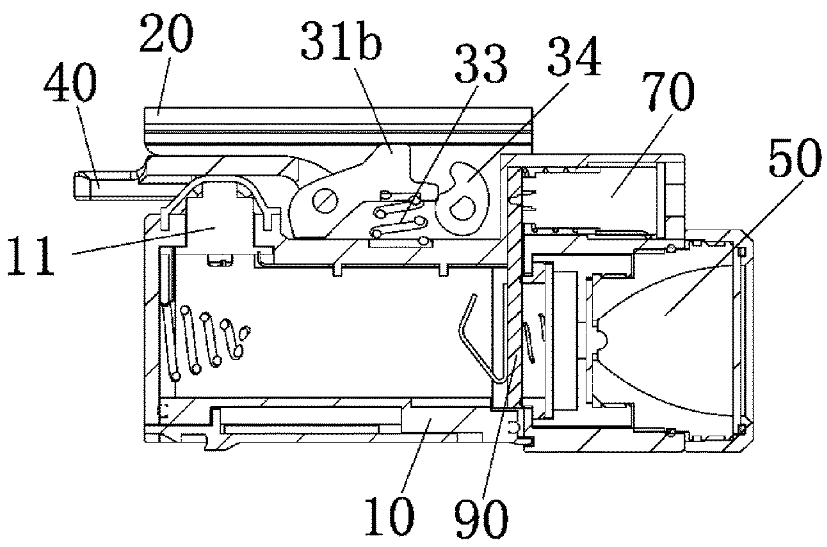
FIG. 5 is an internal structure diagram of the lamp with the assembling and disassembling function in FIG. 3.

The invention further provides a second embodiment of a lamp, specifically as shown in FIG. 3 to FIG. 5. The lamp of the embodiment comprises a lamp tube 10, wherein a fixing element for mounting the lamp on a gun guide rail is arranged on the lamp tube 10, and the fixing element comprises a mounting sliding chute 20 and a locking element 30; the mounting sliding chute 20 is adapted to the gun guide rail, so that the mounting sliding chute 20 can slide into the gun guide rail; the locking element 30 is arranged in the mounting sliding chute 20, and is pressed against and matched with the groove of the gun guide rail to fix the lamp tube 10 on the gun guide rail; an outer contour of an operating element is exposed from an outer contour of the lamp tube 10; an interior of the operating element is connected with the locking element 30; and the operating element can be rotated to drive the locking element 30 to perform locking and unlocking operation on equipment. The locking element 30 comprises a second pressing part 31*b*, an elastic part 33 and a returning part 34, wherein the second pressing part 31*b* is arranged movably towards equipment; a first end of the second pressing part 31*b* is pressed against the groove of the gun guide rail; the elastic part 33 is connected between the lamp tube 10 and the second pressing part 31*b*, and the elastic part 33 applies elastic force of moving towards the equipment to the second pressing part 31*b*; the returning part 34 is pivotally connected to the lamp tube 10; a free end of the returning part 34 is connected with the second pressing part 31*b*, and drives the second pressing part 31*b* to move; the returning part 34 applies force of moving far away from the groove of the gun guide rail to the second pressing part 31*b*; a pivot of the returning part 34 is mounted on the lamp tube 10; the operating element comprises a second operating part 32*b*; and the second operating part 32*b* is in drivable connection with the returning part 34, and drives the returning part 34 to pivot.

After the gun guide rail slides into the mounting sliding chute 20, the elastic part 33 applies elastic force to the second pressing part 31*b* to reliably clamp the second pressing part 31*b* into the groove of the gun guide rail to finish locking the gun lamp relative to the gun guide rail, thereby locking the gun lamp onto a gun. The elastic part 33 in the embodiment is a spring, one end of the elastic part is pressed against the lamp tube, and the other end of the elastic part is pressed against the second pressing part. When unlocking is required, the second operating part 32*b* is moved to drive the returning part 34 to rotate, and the free end of the returning part 34 moves the second pressing part 31*b* away from the groove of the gun guide rail to a direction opposite to the elastic force, thereby releasing the locked state of the locking element of the gun lamp relative to the gun guide rail.

The lamp of the embodiment further comprises a handle lock operating part 41*b* and a handle lock 42*b*, wherein the handle lock operating part 41*b* is connected together with the handle lock 42*b*, and both the handle lock operating part 41*b* and the handle lock 42*b* are arranged between the lamp tube 10 and the handle portion 40; the handle lock operating part 41*b* can be pushed to drive the handle lock 42*b* to move; and the handle lock 42*b* has a first state in which the handle portion 40 is pressed so as not to be moved and a second state in which the handle portion 40 can freely move.

A sighting device 70 and a circuit board 90 are further arranged on the lamp tube 10, wherein both the sighting device 70 and the lamp base 50 are electrically connected with the circuit board 90; the circuit board 90 is mounted in the lamp tube 10; and the sighting device 70 is mounted on a housing of the lamp tube 10 through a screw 90. Electric connection between each of the sighting device 70 and the lamp base 50 and the circuit board 90 adopts elastic conductor connection. It is important to note that the electric connection between each of the sighting device 70 and the lamp base 50 and the circuit board is non-wire welded connection and can substitute for elastic conductor connection, and the same technical effect can be achieved.

The above is only the preferred embodiment of the invention and not intended to limit the invention. For those skilled in the art, the invention may have various modifications and variations. Any modifications, equivalent replacements, improvements and the like made within the spirit and principle of the invention shall fall within the scope of protection of the invention.

The invention claimed is:

1. A lamp with an assembling and disassembling function, comprising a lamp tube, wherein a fixing element for mounting with an equipment guide rail is arranged on the lamp tube, the fixing element comprising:

a mounting sliding chute, which is adapted to the equipment guide rail, so that the mounting sliding chute can slide into the equipment guide rail;

a locking element, which is arranged in the mounting sliding chute and pressed against and matched with a groove of the equipment guide rail to fix the lamp tube on the equipment guide rail, an extension direction of the groove of the equipment guide rail is intersected with a length direction of the equipment guide rail; and an operating element, an outer contour of the operating element being exposed from an outer contour of the lamp tube, an interior of the operating element being connected with the locking element, the operating element being rotated to drive the locking element to perform locking and unlocking operation on equipment;

wherein the locking element comprises:

a second pressing part, which is arranged movably towards the equipment, a first end of the second pressing part being pressed against the groove of the equipment guide rail;

an elastic part, which is connected between the lamp tube and the second pressing part and applying elastic force of moving towards the equipment to the second pressing part;

a returning part, which is pivotally connected to the lamp tube, a free end of the returning part being connected with the second pressing part and applying force of moving far away from the equipment to the second pressing part; and moreover, the operating element comprises a second operating part, and the second operating part is in drivable connection with the returning part, and drives the returning part to pivot.

2. The lamp with the assembling and disassembling function according to claim 1, wherein a pushbutton switch is arranged in the lamp tube; the lamp with the assembling and disassembling function further comprises a handle portion; and a first end of the handle portion is in drivable connection with the pushbutton switch, and a second end of the handle portion is positioned on the outer side of the lamp tube.

3. The lamp with the assembling and disassembling function according to claim 1, further comprising a lamp base connected with the lamp tube, wherein a battery is arranged in the lamp tube; and a non-electric connected elastic element is arranged between one electrode of the battery and an electrode connecting part in the lamp tube.

4. The lamp with the assembling and disassembling function according to claim 2, further comprising a handle lock operating part and a handle lock, wherein the handle lock operating part is connected together with the handle lock; moreover, both the handle lock operating part and the handle lock are arranged between the lamp tube and the handle portion; the handle lock operating part can be pushed to drive the handle lock to move; and the handle lock have a first state in which the handle portion is pressed so as not to be moved and a second state in which the handle portion can freely move.

5. The lamp with the assembling and disassembling function according to claim 3, wherein a sighting device and a circuit board are further arranged on the lamp tube; both the sighting device and the lamp base are electrically connected with the circuit board; the circuit board is mounted on the lamp tube; and the sighting device is mounted on a housing of the lamp tube.

6. The lamp with the assembling and disassembling function according to claim 5, wherein electric connection between each of the sighting device and the lamp base and the circuit board adopts elastic conductor connection.

* * * * *